April 19, 1960  I. C. SANDBACK  2,933,018

OPTICAL OBJECTIVE

Filed Sept. 20, 1957

Inventor:
Irving C. Sandback

United States Patent Office 2,933,018
Patented Apr. 19, 1960

2,933,018

OPTICAL OBJECTIVE

Irving C. Sandback, Morton Grove, Ill., assignor to Bell & Howell Company, Chicago, Ill., a corporation of Illinois Application September 20, 1957, Serial No. 685,163

7 Claims. (Cl. 88—57)

The invention relates particularly to optical objectives for photographic and projection purposes.

Petzval type objectives, comprising two widely spaced positive doublets, have been extensively used for projection purposes due to their relatively low cost and the large relative aperture attainable thereby. However, this design per se has a relatively high Petzval sum, which translated into image error means that it inherently has a large amount of curvature of field, so that the usable angle of coverage is relatively small. Adaptations of the basic Petzval design have been accomplished by interposing a relatively strong negative element adjacent the image or film plane, but this does not substantially increase the usable angular field.

The invention may be considered an improvement of the basic Petzval design, and has for its objects the provision of an objective which is corrected for spherical and chromatic aberration, coma, astigmatism, field curvature and distortion, and which has a usable angular field which is much greater than that of the conventional Petzval design without materially increasing the overall complexity of the optical system, while still maintaining a relatively high relative apereure and adequate clearance space between the rearmost component and the image or focal plane of the objective.

It is to be understood that the terms "front" and "rear" as herein used refer to the ends of the objective respectively nearer the long and short conjugates thereof.

Figure 1:
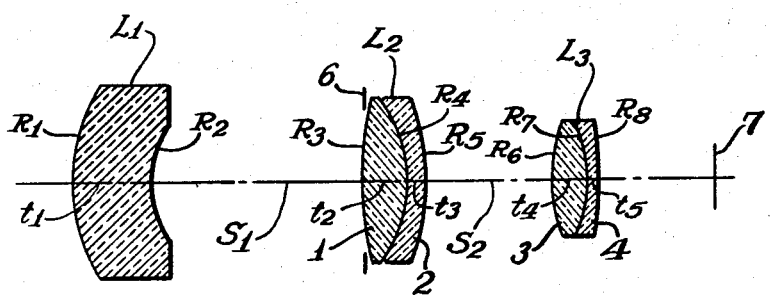
Figure 2:
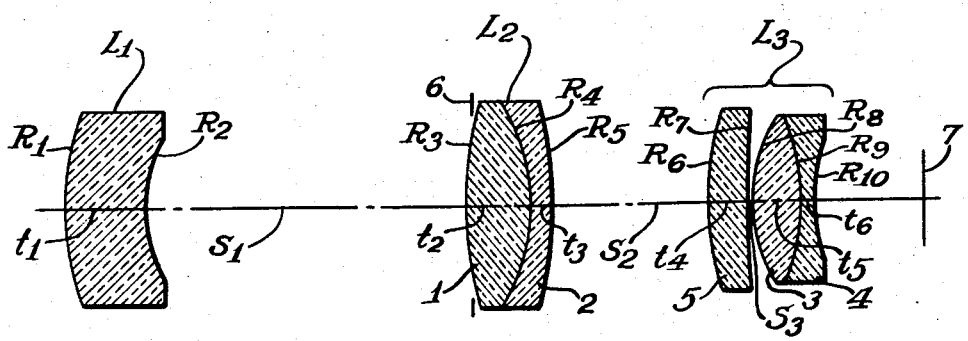

In the accompanying drawing forming a part hereof, Figures 1 and 2 respectively illustrate Examples 1 and 2 described herein of different objectives embodying the invention, and referring thereto each of the objectives comprises three air spaced components of which, beginning with the front of the objectives, the first component, designated at $L_1$, is negative and is of meniscus form, and as shown comprises a single element, and the second and third components, respectively designated at $L_2$ and $L_3$, are positive and comprise achromatized doublets, and the third component $L_3$ of Figure 2 additionally comprises a positive element closely spaced in front of the doublet thereof. The front and rear elements of the doublet of $L_2$ are respectively designated at 1 and 2 in Figures 1 and 2, the front and rear elements of the doublet of $L_3$ are respectively designated at 3 and 4 in Figures 1 and 2, and the additional positive element of $L_3$ in Figure 2 is designated at 5.

Beginning with the front end of each objective $R_1$, $R_2$, etc. respectively designate the optical surfaces of the lens elements, $t_1$, $t_2$, etc. the axial thicknesses of the lens elements, $s_1$, $s_2$, etc. the axial separations of the components or lens elements, 6 designates the aperture stop of the objective, which is disposed at the front of the second component, and 7 designates the image or focal plane.

The herein Examples 1 and 2 of the invention respectively conform with the following tables in which dimensions are in terms of inches, and in which the indices of refraction for the D line and the Abbe dispersion numbers are respectively designated at $n_d$ and $v$:

Example 1

[Equivalent focal length 1.0000. Back focal length .6626. Aperture f/1.6.]

| | | | | |
|---|---|---|---|---|
| $L_1$ | $R_1 = +1.0157$ | $t_1 = .4368$ | $n_d = 1.5704$ | $v = 48.1$ |
| | $R_2 = + .5660$ | | | |
| | | $s_1 = 1.1959$ | | |
| $L_2$ | $R_3 = +2.4600$ | $t_2 = .2468$ | $n_d = 1.620$ | $v = 60.0$ |
| | $R_4 = - .7689$ | $t_3 = .0985$ | $n_d = 1.720$ | $v = 29.2$ |
| | $R_5 = -1.3085$ | | | |
| | | $s_2 = .7161$ | | |
| $L_3$ | $R_6 = + .8779$ | $t_4 = .2052$ | $n_d = 1.517$ | $v = 64.5$ |
| | $R_7 = - .7631$ | $t_5 = .0609$ | $n_d = 1.720$ | $v = 29.2$ |
| | $R_8 = -2.6125$ | | | |

Example 2

[Equivalent focal length 1.0000. Back focal length .621. Aperture f/1.4.]

| | | | | |
|---|---|---|---|---|
| $L_1$ | $R_1 = +1.6793$ | $t_1 = .440$ | $n_d = 1.620$ | $v = 60.0$ |
| | $R_2 = + .8015$ | | | |
| | | $s_1 = 1.750$ | | |
| $L_2$ | $R_3 = +2.0064$ | $t_2 = .370$ | $n_d = 1.617$ | $v = 55.0$ |
| | $R_4 = -1.0515$ | $t_3 = .120$ | $n_d = 1.720$ | $v = 29.2$ |
| | $R_5 = -2.2212$ | | | |
| | | $s_2 = .8712$ | | |
| $L_3$ | $R_6 = +1.6664$ | $t_4 = .225$ | $n_d = 1.620$ | $v = 60.0$ |
| | $R_7 = +6.6666$ | | | |
| | | $s_3 = .0075$ | | |
| | $R_8 = + .8622$ | $t_5 = .285$ | $n_d = 1.589$ | $v = 61.0$ |
| | $R_9 = -1.2022$ | $t_6 = .075$ | $n_d = 1.720$ | $v = 29.2$ |
| | $R_{10} = +1.4110$ | | | |

It will be observed that the objective of the invention has a relatively long back focal length, it exceeding one-half of the equivalent focal length of the objective, and the objective has the following characteristics:

The distribution of power over the three components $L_1$, $L_2$ and $L_3$ complies with $$+2.5\ F < -f_1 < +4.0\ F$$
$$1.1\ F < f_2 < 2.1\ F$$
$$1.2\ F < f_3 < 2.3\ F$$

the separations of the components comply with $$.8\ F < s_1 < 2.0\ F$$
$$.6\ F < s_2 < 1.0\ F$$

where $f_1$, $f_2$ and $f_3$ are the focal lengths of the three components, and F is the equivalent focal length of the objective, the negative meniscus first component $L_1$ complies with $$.4 < \frac{R_2}{R_1} < .6$$

in order to retain the correct proportional amount of positive third order spherical, coma, and astigmatism correction, and the positive second component $L_2$ complies with $$.7 < \frac{-R_3}{R_5} < 2.0$$

primarily to maintain a satisfactory balance of spherical aberration.

The first component $L_1$ provides a flat field and increases back focal length, and may be in the form of a doublet for improvement of correction.

The invention, as embodied in Example 1, has the following additional characteristics:

The first, second and third components $L_1$, $L_2$ and $L_3$ comply with $$.8F < R_1 < 2.0F$$
$$.4F < R_2 < .9F$$
$$1.8F < R_3 < 2.7F$$

$$+1.0F < -R_5 < 2.5F$$
$$.6F < R_6 < 1.5F$$
$$-2.2F < -R_8 < +2.9F$$

and the third component $L_3$ complies with $$-.5 < \frac{R_6}{R_8} < +1.5$$

more particularly to balance the coma adequately.

Referring to Example 2, the additional positive element 5 of the third component $L_3$ closely spaced in front of the doublet 3—4 thereof, substantially reduces the higher order spherical aberration, thereby enabling the relative aperture to be increased to $f/1.4$, and it is within the scope of the invention to compound one or more of the other components for better correction of the higher order aberration.

Since different embodiments of the invention can be made without departing from the spirit and scope thereof, it is intended that all matter shown in the accompanying drawing and described hereinabove shall be interpreted as illustrative and not in a limiting sense.

Wthat is claimed as new is:

1. An optical objective comprising three air spaced components of which, beginning at the front end of the objective, the first component is negative and of meniscus form and the second and third components are positive and comprise achromatized doublets, and further characterized in that the distribution of power over said components complies with $$+2.5F < -f_1 < +4.0F$$
$$1.1F < f_2 < 2.1F$$
$$1.2F < f_3 < 2.3F$$

the separations of said components comply with $$.8F < s_1 < 2.0F$$
$$.6F < s_2 < 1.0F$$

said first component complies with $$.4 < \frac{R_2}{R_1} < .6$$

and said second component complies with $$.7 < \frac{-R_3}{R_5} < 2.0$$

where $f_1$, $f_2$ and $f_3$ are the focal lengths respectively of said first, second and third components, F is the equivalent focal length of the objective, $s_1$ and $s_2$ are the separations respectively of said first and second and of said second and third components, $R_1$ and $R_2$ are respectively the radii of the front and rear surfaces of said first component, and $R_3$ and $R_5$ are respectively the radii of the front and rear surfaces of said second component.

2. An optical objective as defined in claim 1 and further characterized in that the back focal length of the objective exceeds one half of the equivalent focal length thereof.

3. An optical objective as defined in claim 1 and further characterized in that said third component additionall comprises a positive element closely spaced in front of the doublet thereof.

4. An optical objective as defined in claim 1 and further characterized in that said first, second and third components comply with $$.8F < R_1 < 2.0F$$
$$.4F < R_2 < .9F$$
$$1.8F < R_3 < 2.7F$$
$$+1.0F < -R_5 < +2.5F$$
$$.6F < R_6 < 1.5F$$
$$-2.2F < -R_8 < +2.9F$$

and said third component complies with $$-.5 < \frac{R_6}{R_8} < +1.5$$

where $R_1$ and $R_2$ are the radii respectively of the front and rear surfaces of said first component, $R_3$ and $R_5$ are the radii respectively of the front and rear surfaces of said second component, and $R_6$ and $R_8$ are the radii respectively of the front and rear surfaces respectively of said third component.

5. An optical objective as defined in claim 4 and further characterized in that the back focal length of the objectives exceeds one half of the equivalent focal length thereof.

6. An optical objective comprising three air spaced components of which, beginning with the front end of the objective, the first component is negative and of meniscus form and the second and third components are positive and comprise achromatized doublets, and further characterized in that said objective complies substantially with the following table in which the dimensions are in terms of inches, and beginning with the front end of the objective $L_1$ to $L_3$ designate the components, $R_1$ to $R_8$ the radii of the surfaces, $t_1$ to $t_5$ the axial thicknesses, $s_1$ and $s_2$ the axial separations, $n_d$ the refractive indices for the D line, and $v$ the Abbe dispersion numbers:

| | | | | |
|---|---|---|---|---|
| $L_1$ | $R_1=+1.0157$ | $t_1=.4368$ | $n_d=1.5704$ | $v=48.1$ |
| | $R_2=+.5660$ | | | |
| | | $s_1=1.1959$ | | |
| $L_2$ | $R_3=+2.4600$ | $t_2=.2468$ | $n_d=1.620$ | $v=60.0$ |
| | $R_4=-.7689$ | | | |
| | | $t_3=.0985$ | $n_d=1.720$ | $v=29.2$ |
| | $R_5=-1.3085$ | | | |
| | | $s_2=.7161$ | | |
| $L_3$ | $R_6=+.8779$ | $t_4=.2052$ | $n_d=1.517$ | $v=64.5$ |
| | $R_7=-.7631$ | | | |
| | | $t_5=.0609$ | $n_d=1.720$ | $v=29.2$ |
| | $R_8=-2.6125$ | | | |

7. An optical objective comprising three air spaced components of which, beginning at the front end of the objective, the first component is negative and of meniscus form and the second and third components are positive and comprise achromatized doublets and the third component additionally comprises a positive element closely spaced in front of the doublet thereof, and further characterized in that said objective complies substantially with the following table in which the dimensions are in terms of inches, and beginning with the front end of the objective $L_1$ to $L_3$ designate the components $R_1$ to $R_{10}$ the radii of the surfaces, $t_1$ to $t_6$ the axial thicknesses, $s_1$ to $s_3$ the axial separations, $n_d$ the refractive indices for the D line, and $v$ the Abbe dispersion numbers:

| | | | | |
|---|---|---|---|---|
| $L_1$ | $R_1=+1.6793$ | $t_1=.440$ | $n_d=1.620$ | $v=60.0$ |
| | $R_2=+.8015$ | | | |
| | | $s_1=1.750$ | | |
| $L_2$ | $R_3=+2.0064$ | $t_2=.370$ | $n_d=1.617$ | $v=55.0$ |
| | $R_4=-1.0515$ | | | |
| | | $t_3=.120$ | $n_d=1.720$ | $v=29.2$ |
| | $R_5=-2.2212$ | | | |
| | | $s_2=.8712$ | | |
| $L_3$ | $R_6=+1.6664$ | $t_4=.225$ | $n_d=1.620$ | $v=60.0$ |
| | $R_7=+6.6666$ | | | |
| | | $s_3=.0075$ | | |
| | $R_8=+.8622$ | $t_5=.285$ | $n_d=1.589$ | $v=61.0$ |
| | $R_9=-1.2022$ | | | |
| | | $t_6=.075$ | $n_d=1.720$ | $v=29.2$ |
| | $R_{10}=+1.4110$ | | | |

References Cited in the file of this patent

UNITED STATES PATENTS

| | | |
|---|---|---|
| 1,863,099 | Bowen | June 14, 1932 |
| 2,076,190 | Wood | Apr. 6, 1937 |
| 2,384,624 | Kingslake et al. | Sept. 11, 1945 |
| 2,594,020 | Hopkins et al. | Apr. 22, 1952 |
| 2,594,021 | Hopkins et al. | Apr. 22, 1952 |

FOREIGN PATENTS

| | | |
|---|---|---|
| 891,469 | Germany | Sept. 28, 1953 |